United States Patent [19]
Bitterly et al.

[11] Patent Number: 5,614,777
[45] Date of Patent: Mar. 25, 1997

[54] FLYWHEEL BASED ENERGY STORAGE SYSTEM

[75] Inventors: Jack G. Bitterly, Woodland Hills; Steven E. Bitterly, Agoura, both of Calif.

[73] Assignee: U.S. Flywheel Systems, Newbury Park, Calif.

[21] Appl. No.: 384,573

[22] Filed: Feb. 6, 1995

[51] Int. Cl.⁶ .............................. H02K 7/02; H02K 1/12
[52] U.S. Cl. ........................ 310/74; 310/191; 310/254
[58] Field of Search ...................... 310/74, 191, 209, 310/254, 256; 290/15, 38 A; 322/4; 74/572

[56] References Cited

U.S. PATENT DOCUMENTS

| | | | |
|---|---|---|---|
| 4,660,435 | 4/1987 | Davis et al. | 74/572 |
| 4,821,599 | 4/1989 | Medlicott | 74/572 |
| 4,996,016 | 2/1991 | Walls et al. | 264/258 |
| 5,124,605 | 6/1992 | Bitterly et al. | 310/74 |
| 5,462,402 | 10/1995 | Bakholdin et al. | 415/90 |

FOREIGN PATENT DOCUMENTS

| | | | |
|---|---|---|---|
| 300126 | 1/1989 | European Pat. Off. | |
| 4007424 | 10/1990 | Germany | 310/74 |
| WO92/05617 | 4/1992 | WIPO | |

*Primary Examiner*—Clayton E. LaBalle
*Attorney, Agent, or Firm*—Blakely, Sokoloff, Taylor & Zafman

[57] ABSTRACT

A compact energy storage system includes a high speed rotating flywheel and an integral motor/generator unit. The rotating components are contained within a vacuum enclosure to minimize windage losses. The flywheel rotor has a unique axial profile to both maximize the energy density of the flywheel and to maximize the volumetric efficiency of the entire system. The rotor is configured with hollowed-out regions at each axial end to accommodate magnetic bearing assemblies. The integral motor/generator is disposed on a tail shaft of the flywheel rotor, outboard of the magnetic bearing assembly. The motor/generator stator is mounted on a translation carriage for axial movement. During normal operation, the stator is in operative alignment with a rotor on the flywheel shaft. However, when neither motor nor generator operation is required, the stator is extended to an axial position where it is effectively decoupled from the rotor. A magnetic shield surrounding the rotor confines the lines of magnetic flux to minimize eddy currents, and thereby minimize parasitic energy losses that would otherwise slow the flywheel during idle periods.

16 Claims, 9 Drawing Sheets

FIG. 6
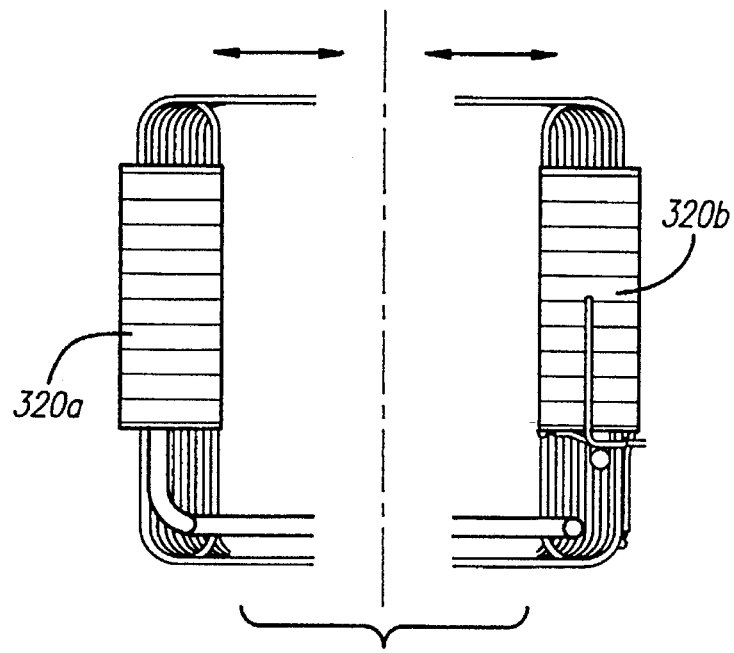
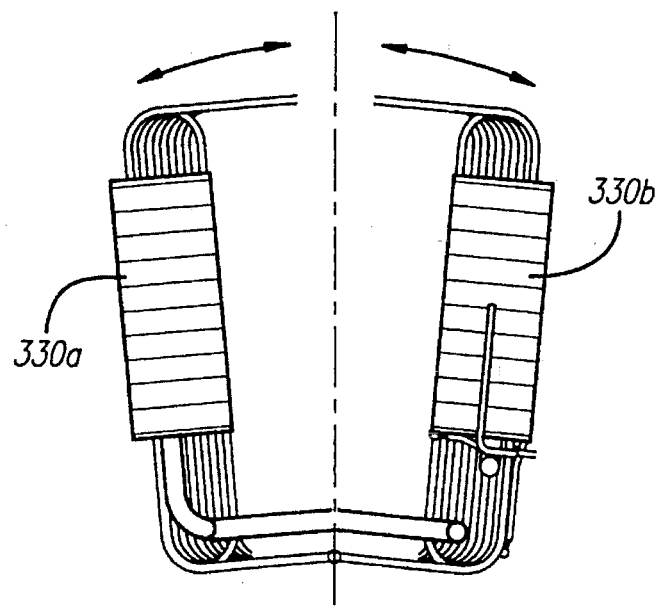
FIG. 7

FLYWHEEL BASED ENERGY STORAGE SYSTEM

BACKGROUND OF THE INVENTION

1. Field of the Invention

This invention relates generally to the field of energy storage devices and, particularly, to a complete compact mobile flywheel system for storage and controlled release of kinetic energy.

2. Prior Art

The use of flywheels as energy storage devices is ancient art. The flywheel (FW) is an attractive means for storing energy for a number of reasons. In concept, it is a relatively simple device with which energy can be readily stored and extracted, either by mechanical means or by using electric motors and generators. In theory, the rate at which energy can be added or withdrawn is very high and there are no inherent limitations on the number of charge and discharge cycles that can be used. In these respects, mechanical energy storage offers marked advantages over the chemical energy storage of conventional batteries. Nevertheless, until relatively recently, it has generally been thought that flywheels do not offer a viable energy storage alternative. This has been largely due to the perceived disadvantages of flywheels relative to batteries with respect to cost and energy density. However, advances in materials technology and design of high speed rotating systems have made flywheels an increasingly attractive alternative. Moreover, environmental concerns relating to conventional energy storage means, particularly in the context of electrically powered vehicles, have focused renewed attention on flywheel systems. In recent years, there has been a great deal of interest in reducing the weight and size of flywheel based energy storage devices to provide such a device that can be practically utilized as a mechanical battery in an electrically powered vehicle. A total, non-hybrid FW system can be shown to have greater range and power than standard conventional internal combustion engine vehicles. This is possible with the advent of new materials and advanced electronics.

There are two basic flywheel configurations useful for high energy density mechanical batteries. One type has the flywheel fixed to the shaft and rotating together in unison. This configuration is sometimes referred to as a conventional rotor. The other type has the flywheel rotating about a stationary shaft. This is sometimes referred to as an inside out rotor. Both types of configurations have certain advantages and disadvantages. Advantages for the inside out rotor system include 1) compact volumetric packing, 2) no rotor to axle connection other than through the magnetic bearing, and 3) columnar support through stationary axle possible. Advantages for the conventional rotor system include 1) smaller and lighter magnetic bearings and motor/generator sub systems; 2) ability to remove heat from the motor/generator more easily precluding most heat dissipation into the composite rotor; 3) lower stresses on the magnetic bearing target actuators and lower stresses on the motor rotor; 4) reduced radial growth gap problems between the rotor and stator of the motor/generator and magnetic bearings; and 5) extension of the stator away from the permanent magnet rotating rotor, thereby totally removing magnetic drag losses during the quiescent (coasting) energy storage state. These losses can otherwise be high enough to almost fully discharge a FW by losses in 12 hours as compared to over a month by clever design of system components as described by this patent.

SUMMARY OF THE INVENTION

The present invention provides a compact energy storage system comprising a high speed rotating flywheel of the "conventional" configuration and an integral motor/generator unit. The rotating components are contained within a vacuum enclosure to minimize windage losses, along with an automatic rechargeable getter to maintain the required high vacuum. The flywheel rotor has a unique axial profile to both maximize the energy density of the flywheel, to maximize the volumetric efficiency of the entire system and to provide a circumferential ridge to add balance weights without the damaging procedure of grinding away fibers. The rotor is configured with hollowed-out regions at each axial end to accommodate magnetic bearing assemblies.

The integral motor/generator is disposed on a tail shaft of the flywheel rotor, outboard of the magnetic bearing assembly. The motor/generator stator is mounted on a translation carriage for axial movement. During normal operation the stator is in operative alignment with a rotor on the flywheel shaft. However, when no current is demanded from the generator, the stator is extended to an axial position where it is effectively decoupled from the rotor. A magnetic shield surrounding the rotor confines the lines of magnetic flux to minimize eddy currents, and thereby minimize parasitic energy losses that would otherwise slow the flywheel during idle periods.

BRIEF DESCRIPTION OF THE DRAWINGS

FIG. 6 illustrates an alternative retractor assembly for the motor/generator stator.

FIG. 7 illustrates a second alternative retractor assembly for the motor/generator stator.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

Figure 1A:
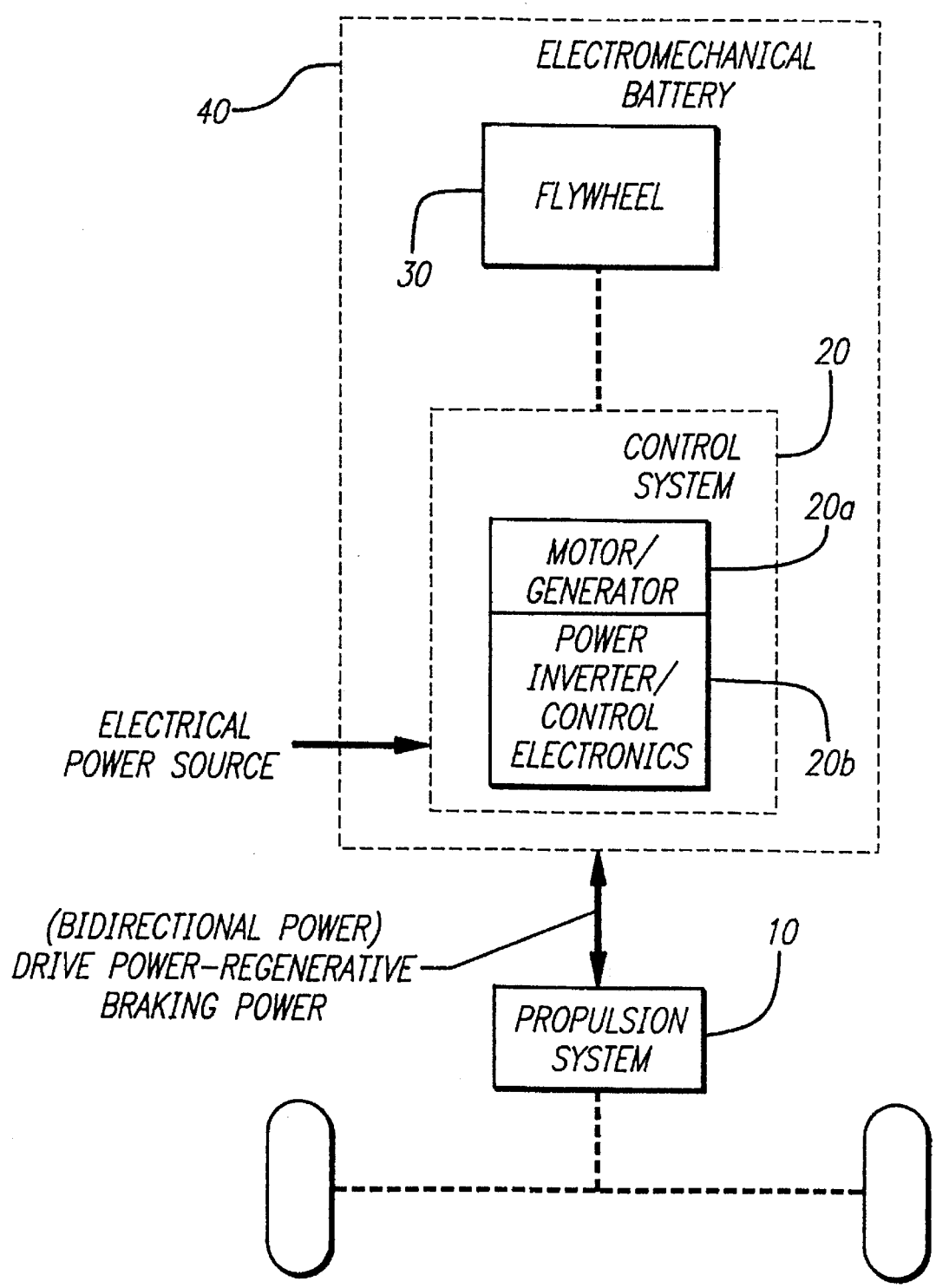
FIG. 1a is an overall block diagram of a typical system employing the present invention.

FIG. 1a is an overall block diagram of a typical system employing the present invention. Such a system may comprise, for example, a propulsion system for a road or rail vehicle. Other applications include stationary power storage systems, aircraft or space vehicle power storage systems, undersea power storage systems, and even man-carryable power storage devices. In the particular example of a vehicle propulsion system, traction motor 10 is a three phase AC or DC motor and power inverter 20b comprises a solid state switching circuit for developing drive currents for each motor winding. Electrical power for power inverter 20b is supplied from a flywheel 30 coupled to a motor/generator 20a. The motor/generator 20a and power inverter 20b are elements of the control system 20. The electromechanical battery 40 consists of flywheel 30 and control system 20. Apart from developing motor drive currents, power inverter 20b also conditions a recharging current to motor generator 20a. The motor generator 20a spins the flywheel 30 storing kinetic energy or charging the battery. The recharging current is developed from an external charging source to which the vehicle is periodically connected.

Figure 1B:
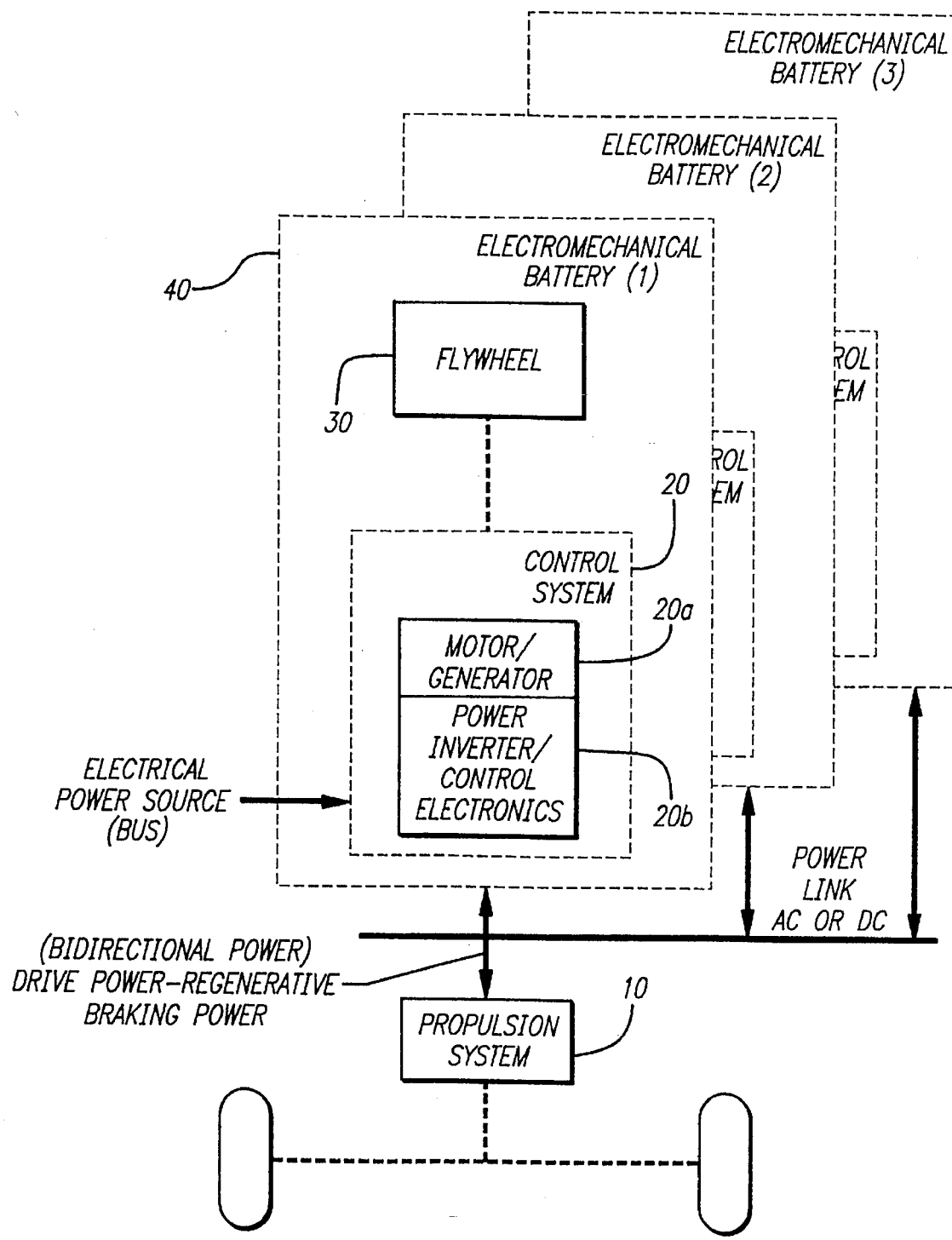
FIG. 1b is a system block diagram with multiple electromechanical batteries in a parallel configuration.

FIG. 1b is an electromechanical battery system topology configured for parallel operation to increase system energy capacity.

Figure 1C:
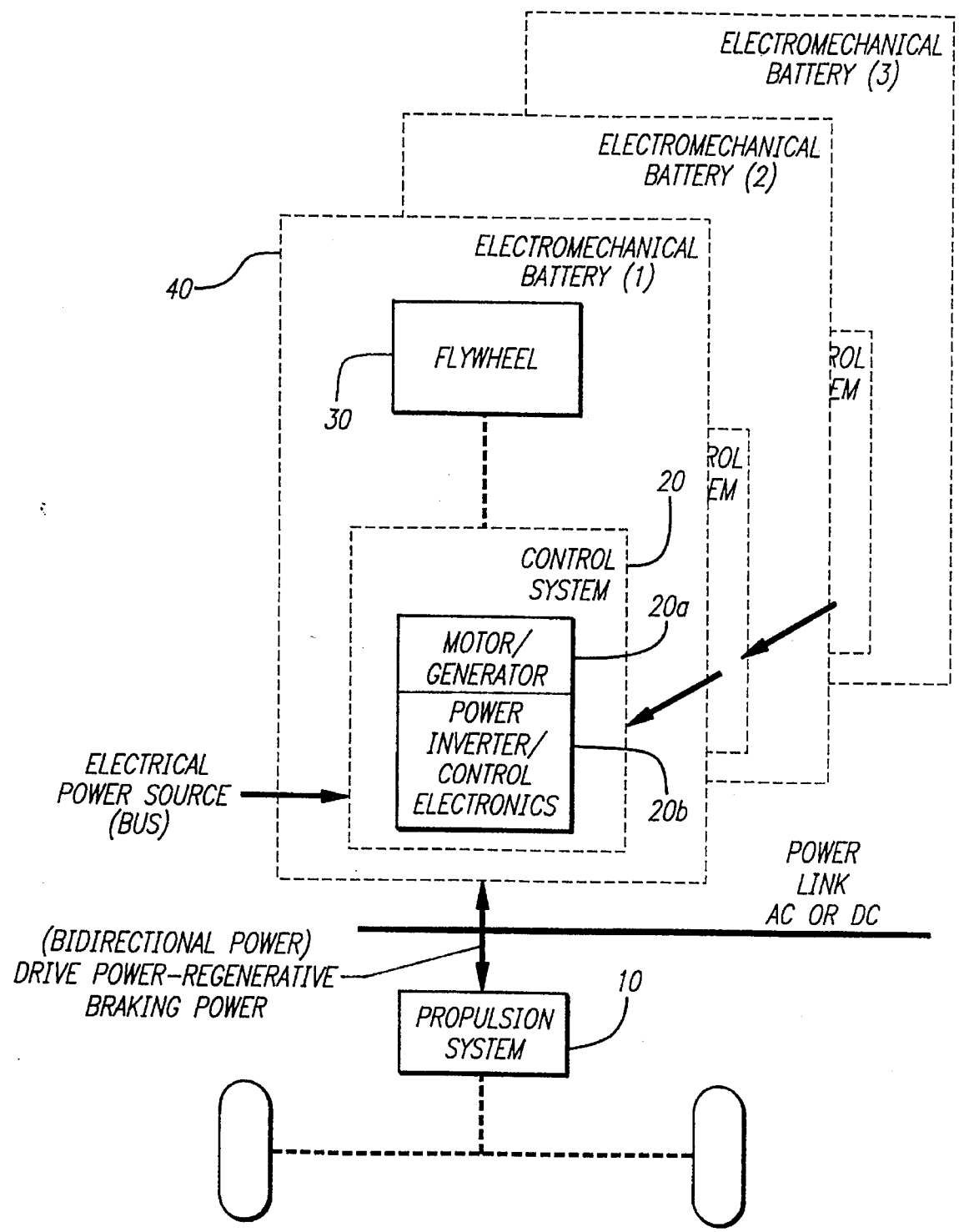
FIG. 1c is a system block diagram with multiple electromechanical batteries in a series configuration.

FIG. 1c is an electromechanical battery system topology configured for series operation to increase output voltage capability.

Figure 3:
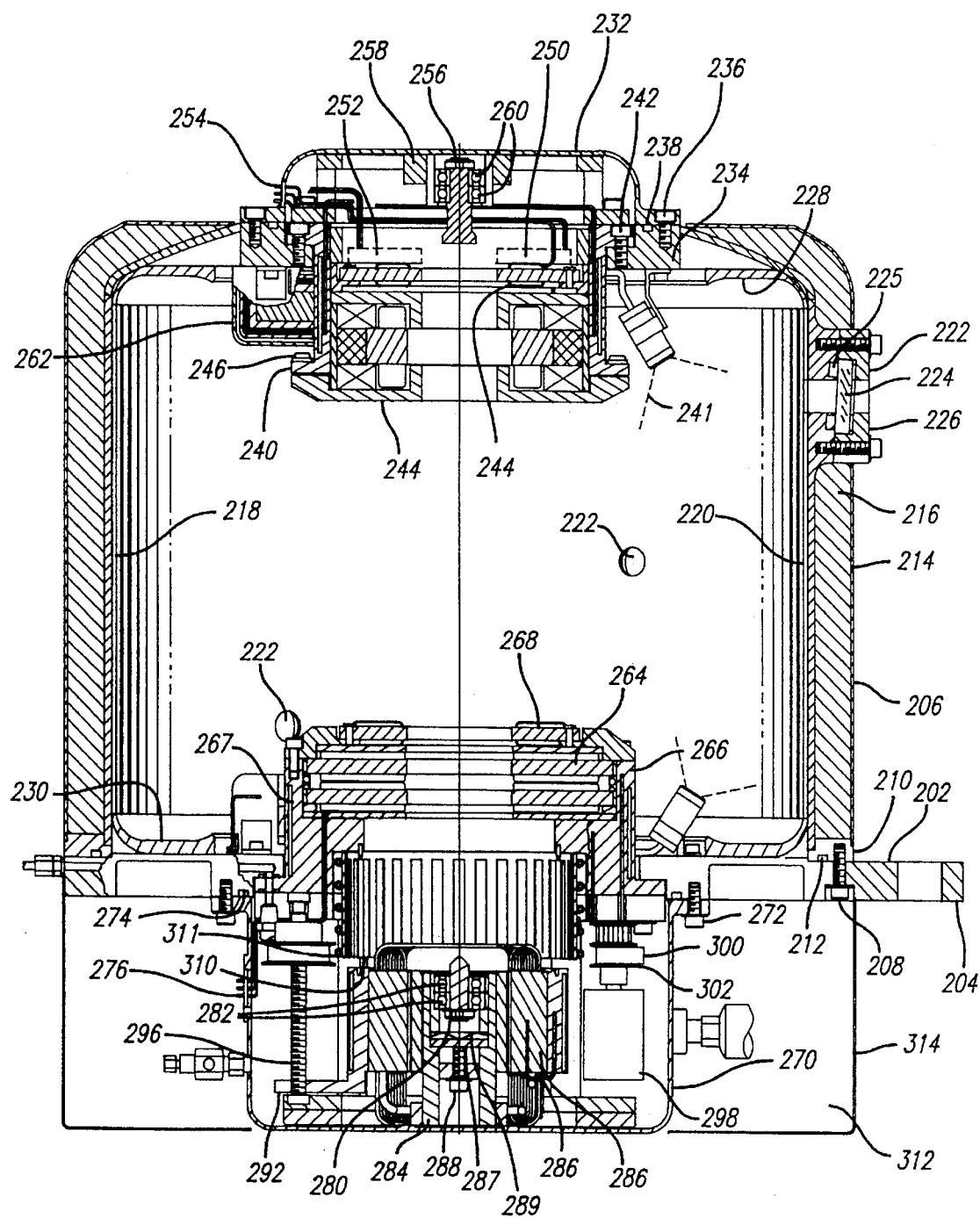
FIG. 3 is a cross-sectional view of the stationary components of the energy storage system including vacuum containment and safety shield.
Figure 4:
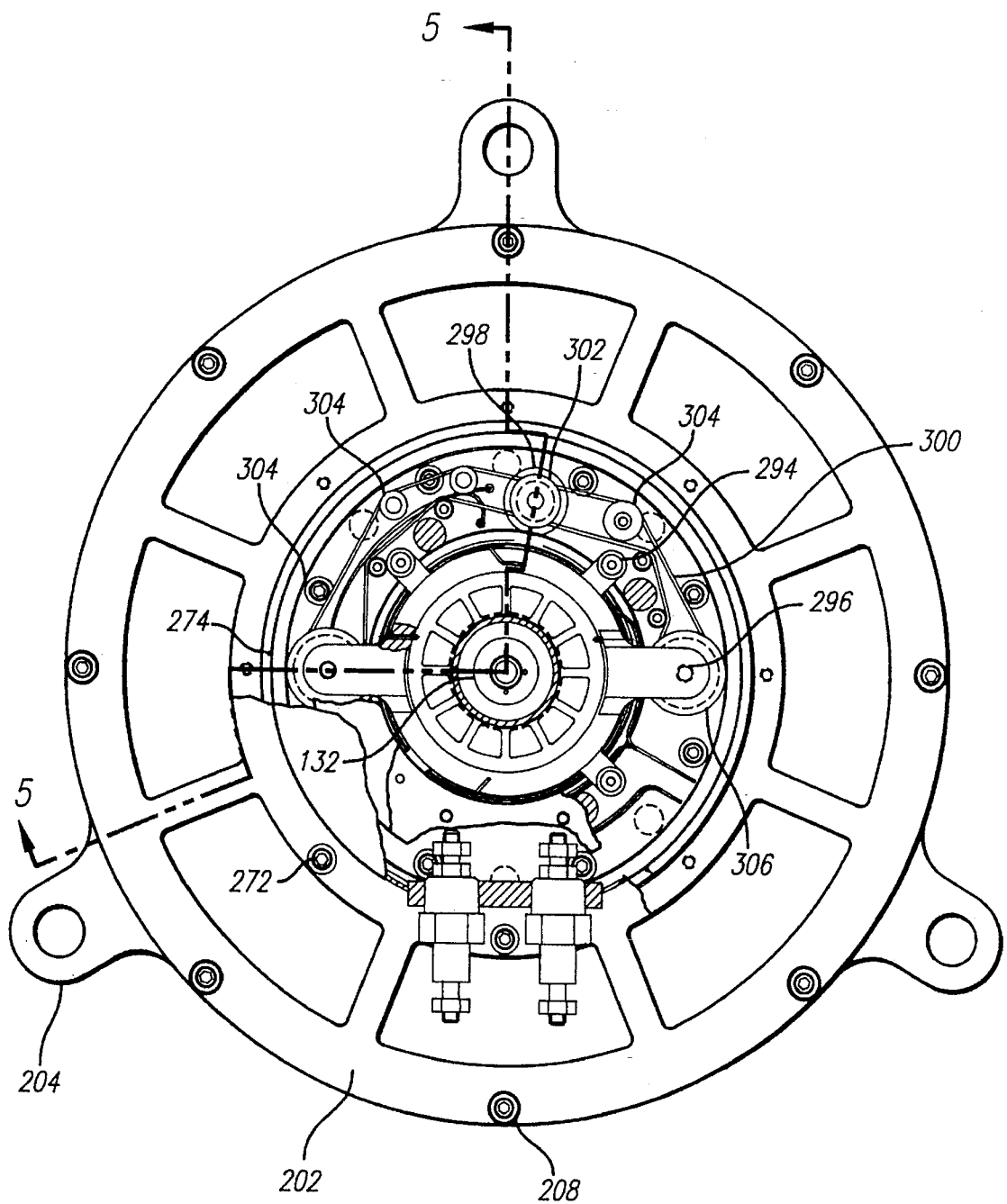
FIG. 4 is a bottom plan view of the stationary components shown in FIG. 3 also showing the stator pull-out mechanism.
Figure 5:
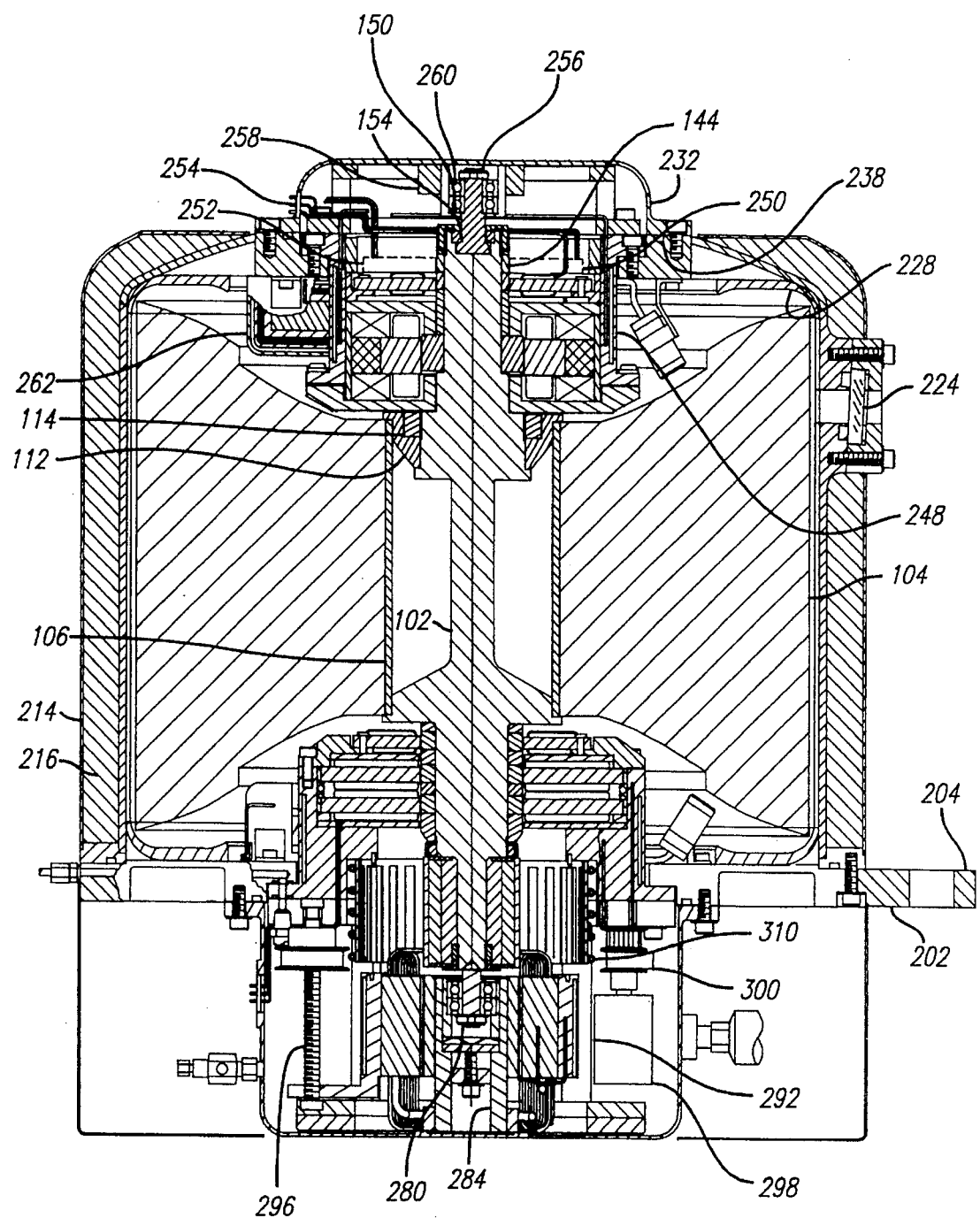
FIG. 5 is a combined cross-sectional view showing both the rotating and stationary components of the energy storage system.

Mechanical battery 30 utilizes a rotating flywheel to store kinetic energy. Energy is added and removed by means of a motor/generator coupled to the flywheel in a common housing. For clarity of explanation, it is convenient to first describe the rotating components of the flywheel, including the motor/generator rotor (FIG. 2), separately from the stationary components of the housing and motor/generator stator (FIG. 3). The relationship of rotating and stationary components is shown in FIGS. 4 and 5, which illustrate the complete flywheel module.

Figure 2:
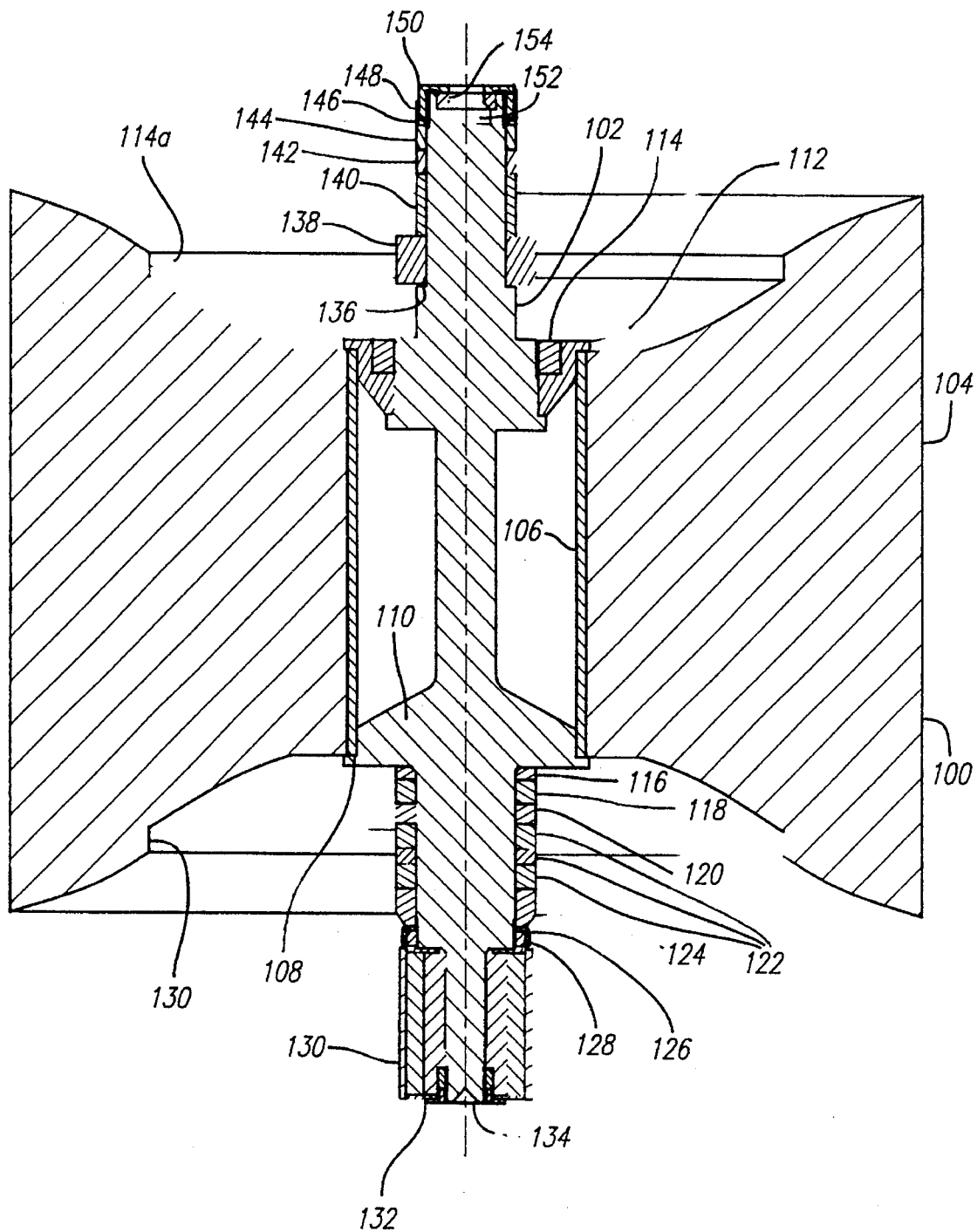
FIG. 2 is a cross-sectional view of the rotating components of an energy storage system constructed in accordance with the present invention.

FIG. 2 is a cross-sectional view of the rotating components of mechanical battery 30. A rotating shaft design is employed wherein the rotating structure is rigidly mounted to central shaft 102. The principal rotating mass is contained in rotor 104, which is of composite construction utilizing one or more high tensile strength fiber materials wound around rotor sleeve 106. Sleeve 106 is supported on shaft 102 by annular step 106 machined into rotor flange 110 and by support ring 112. Support ring 112 is a press fit on shaft 102 and is secured thereto by rotor nut 114.

Rotor 104 is preferably constructed by winding high tensile strength fibers under computer controlled variable tension to achieve the desired rotor profile and the desired internal radial stress profile that will prevent radial delamination. The fibers are either pre-impregnated with epoxy or another suitable resin (prepreg) or are coated with resin during the winding process and wet-wound onto sleeve 106. Ideally, a combination of fibers is employed, with different fibers defining successive radial layers. Materials with relatively higher densities and relatively lower module of elasticity are preferred for layers closer to the axis of rotation, whereas lower density materials with higher module of elasticity are preferred in the outer layers. Any number of layers may be constructed in this fashion, although, as a practical matter, two or three will be sufficient to realize the benefits of such construction. Of course, rotor 104 may also be wound with a single fiber material if desired. In addition, rotor 104 may include cross fibers wound circumferentially and/or axially to increase strength and stiffness in the direction desired. This may also be accomplished with one or more layers constructed of a cross-woven cloth rather than a single fiber strand or by the addition of high strength particulates (for example, carbon dust) or by chopped fibers or by tiny fiber whiskers of minute diameters compared to the basic structural fiber(s).

As one example of layered rotor construction, an inner layer of glass fiber may be overlaid with a layer of carbon fiber. Whatever fiber materials are utilized for rotor construction, the winding process is performed under controlled tension to minimize stress build-up and maximize the potential operating speed of the rotor. The illustrated embodiment has been designed for a nominal operating speed in excess of 100,000 RPM with all critical speeds above the operating speed. The tension of the fiber as it is wound is preferably controlled so as to provide a tension profile that has its highest value adjacent to sleeve 106 and that monotonically decreases toward the outer periphery. Axially, the fiber tension is preferably controlled to be highest at the axial center of mass and to decrease at an equal rate toward each axial end.

The axial profile of rotor 104 is designed to maximize the energy density of the rotor and also to maximize the volumetric efficiency of the total assembly. In this latter regard, the hollowed-out regions at the top and bottom of the rotor accommodate the stationary components of the magnetic bearing assemblies and electronic components, which are described below. Inwardly facing cylindrical surfaces 114a and 114b are provided for convenient attachment of balance weights. Attachment of weights to these surfaces permits 2-plane dynamic balancing of rotor 104 without the necessity of grinding away rotor material. Other facing surfaces may also be included of a smaller diameter which will provide multi-plane balancing in addition to the planes defined by surfaces 114a and 114b.

During normal operation, rotor assembly 100 is supported on a lower radial magnetic bearing and an upper combination radial/axial magnetic bearing. It will be recognized that the axial bearing may be combined with either of the upper or lower radial bearings or with both. Furthermore, a completely separate axial bearing could be used. The rotating components of the lower magnetic bearing are disposed on shaft 102 adjacent to flange 110. A spacer 116 is disposed most immediately adjacent to flange 110. Below spacer 116 are target laminations 118 for sensing radial deflection or translation of the rotating shaft. Below this is another spacer 120 and then the radial bearing target assembly 122. Spacer 124 is disposed below the target assembly. Spacers 116, 120 and 124, sensor target laminations 118 and bearing target assembly 122 are all press fit on shaft 102. These components are secured in place by lock washer 126 and magnetic bearing nut 128.

Rotor 130 of the motor/generator is secured to shaft 102 immediately below the magnetic bearing components by locating nut 132. The bottom end of shaft 102 is machined with conical recess 134, which functions as a touch down bearing in the event of a failure of the magnetic bearings or spin-down of the flywheel. This bearing is preferably coated with natural or synthetic diamond to significantly reduce friction and wear.

At the top end of shaft 102, annular step 136 supports the target laminations 138 of the combination magnetic bearing assembly. A spacer 140 separates the bearing target laminations from radial sensor target laminations 142. Adjacent to these laminations is axial sensor/tachometer target 144. Next above this is spacer 146. Components 138–146 are press fit on shaft 102 and are secured by bearing nut lock washer 148 and magnetic bearing nut 150. The top end of shaft 102 is machined with recess 152. Emergency bearing insert 154 is disposed within recess 152 and is held in place by nut 150. The touch down surfaces of insert 154 are also preferably coated with a synthetic diamond material for reducing friction and wear.

With reference now to FIG. 3, the stationary components of mechanical battery 30 are shown in cross-section. The main structural member is base plate 202, which also serves as a cold plate for thermal distribution. An annular region 312 within outer enclosure 314 is available for housing control instrumentation and magnetic bearing electronics, rectifiers, and power conversion and miscellaneous electronics (not shown) so that device 30 is a fully self-contained energy storage module. Plate 202 includes three or more mounting lugs 204 disposed on the periphery thereof for securing mechanical battery 30 to the vehicle chassis or other suitable structure. These lugs may be mounted on or may incorporate damping or vibration isolators as may be required. Adaptive dampers with a variable damping ratio may be incorporated in lugs 204 so that the damping ratio can be adaptively changed as the flywheel spins up or down through critical speeds and/or other housing vibrations.

Housing 206 is secured to base plate 202 with bolts 208 threaded into bottom ring 210. An annular groove is machined into the lower surface of bottom ring 210 to accommodate 0-ring 212. The outer surface of housing 206 is clad with shroud 214 formed of type 304 cres steel. Shroud 214 may also be formed from a light ballistic impact fiber composite. Shroud 214 serves to prevent dust, water and other contaminants from entering containment shield 216, which is spun from a composite fiber with cross weave fibers for rigidity, strength and ballistic impact resistance. Viewing ports 222 are disposed at various locations around housing 206 to facilitate visual inspection of the rotor. Each viewing port 222 has a vacuum-tight window 224 secured by a mounting ring 226 and 0-ring 225.

Within the containment shield is vacuum enclosure 218, which is preferably made of 6061-T6 alloy aluminum or other high heat transfer material with low out-gassing characteristics. The inner surface of the vacuum enclosure 218 has an abrasive liner 220 comprising silicon carbide particles or a similar high-temperature abrasive material. In the event of a rotor failure that brings the rotor into contact with housing 206, abrasive liner 220 will shred the outer surface of the rotor, thereby rapidly decelerating the rotor and converting kinetic energy to heat. Debris deflectors 228 and 230 are installed at the top and bottom, respectively, of housing 206. In the event of catastrophic rotor failure, deflectors 228 and 230 function to contain the composite rotor material as it is shredded by abrasive liner 220 and redirect it in inwardly axial directions Vacuum enclosure cap 232 is secured to top ring 234 with bolts 236. Top ring 234 is machined with an annular groove to accommodate 0-ring 238 for vacuum seal purposes. The stationary components of the upper magnetic bearing assembly are supported by rim member 240, which is secured to top ring 234 with bolts 242. Coil 244 for the upper combination bearing is secured to rim member 240 with bolts 246. Apertures are provided in top ring 234 to permit access to bolts 246. Radial bearing sensor 248 is mounted immediately above coil assembly 244. Above this are mounted axial bearing sensor 250 and tachometer sensor 252. Wiring to provide power to magnetic bearing coil assembly 244 and to transmit signals from sensors 248, 250 and 252 is routed through vacuum feed-through 254 in cap 232.

Emergency back-up bearing 256 is mounted in retainer 258 by means of ball bearing assemblies 260. In normal operation, bearing 256 remains stationary within emergency bearing insert 154 as can be seen with reference to FIG. 2 and FIG. 5. However, in the event of a failure of the magnetic bearings, radial loads are transferred through ball bearing assemblies 260. Retainer 258 is stiffened with a webbed structure that retains sufficient flexure to moderate the bearing loads in the event of a catastrophic failure.

A getter assembly 262 is secured within the vacuum enclosure to top ring 234. The getter assembly absorbs gases due to outgassing of internal components or minor vacuum leakage to maintain the vacuum within enclosure 218 at a level of approximately $10^{-3}$ to $10^{-5}$ Torr. The getter assembly incorporates electrical heating elements which periodically reactivate the absorptive surface. The heating elements are automatically switched on when and if the vacuum level rises above a predetermined threshold.

Turning now to the lower portion of housing 206, radial magnetic bearing assembly 264 is supported on retainer 266, which is secured to base plate 202. Radial bearing sensor 268 is mounted immediately above bearing assembly 264. Bottom vacuum enclosure cap 270 is secured to base plate 202 with bolts 272, capturing 0-ring 274 within an annular groove machined in the bottom surface of base plate 202. A vacuum feed-through 276 is provided for wiring to bring power to lower bearing assembly 264 and to transmit signals from bearing sensor 268.

Lower emergency bearing 280 is carried by ball bearing assemblies 282 in support structure 284. During normal operation, emergency bearing 280 remains stationary with an operating clearance of approximately 0.010 inches below conical recess 134 shown in FIG. 2. However, in the event of failure of the magnetic bearing assemblies, shaft 102 will touch down upon bearing 280, and both thrust and axial loads will be transmitted through ball bearing assemblies 282. As in the case of retainer 258 (upper touch down bearing), support structure 284 retains sufficient flexure to moderate the loads transmitted through bearings 282 in the event of a catastrophic failure. The outer races of bearings 282 are mounted in carrier 286 which telescopes within support structure 284. The vertical position of bearing 280 is adjusted by means of screw 288 acting against disk 287. Wave washer 289 is inserted between disk 287 and carrier 286.

The motor/generator unit is mounted below lower magnetic bearing assembly 264. This mounting location affords excellent heat dissipation, an advantage of the design of storage device 30 over an inside-out rotor design with a centrally located motor/generator. Heat generated within the magnetic bearings and motor/generator is removed by a hermetically sealed phase-change cooling system. Coolant passageway 241 is provided within the upper bearing support structure 240, and a similar coolant passageway 267 is provided within the lower bearing support structure 266. In addition, coolant coils 311 surround magnetic shield 310. A suitable coolant, such as ethylene glycol, is circulated within passageways 241 (upper), 267 (lower) and coils 311 (lower) by a pump (not shown). The coolant is further circulated through condensing coils (also not shown) external to housing 206. To further aid in heat dissipation, a high emissivity coating is applied to the containment shell.

Another important advantage of locating the motor/generator unit below the lower magnetic bearing assembly 264 is that the motor/generator stator may be conveniently extended away from the rotor during periods of electrical inactivity, thereby minimizing parasitic energy losses due to eddy current generation. Such losses vary quadratically with the spin speed and are therefore significant at the operating speed of device 30. By decoupling the rotor and stator of the motor/generator, rotor 104 can coast for weeks at a time when the system is idle. Without this feature, the system would self-discharge in a matter of hours.

Motor/generator stator 290 is shown in its extended (inert) position in FIG. 3. Stator 290 is mounted on translation carriage 292. With reference also to FIG. 4, carriage 292 is supported on linear bearing assemblies 294. Stator translation is accomplished by rotation of rods 296 that are threaded through carriage 292. Rods 296 are rotated by a pulley and belt arrangement driven by motor 298. Belt 300 is driven by pulley 302 on the shaft of motor 298. Belt 300 is guided around idler pulleys 304 and drive pulleys 306, the latter being secured to threaded rods 296. Stator 290 is driven between its normal operating position (shown in FIG. 5) and its fully extended position shown on FIG. 3 by control system 20 which monitors the current drawn from the generator. When no current has been drawn for a predetermined period of time, stator 290 is driven to its fully extended position to minimize energy dissipation. In this position, there is virtually no magnetic coupling between the rotor and stator, and thus there are no appreciable eddy currents to slow the flywheel during idle periods. As soon as a demand for current is sensed or when a motor mode of operation is commanded to add kinetic energy to the flywheel, stator 290 is returned to its normal operating position.

In order to effectively contain magnetic flux lines of motor/generator rotor 130 when stator 290 is extended, a cylindrical magnetic shield 310 is mounted to retainer structure 266. As will be apparent with reference to FIG. 5, shield 310 surrounds rotor 130 when stator 290 is extended. Shield 310 is preferably made of two or more layers of Superalloy or an equivalent material, each approximately 0.020 inches thick. The layers of magnetic shielding material preferably have many slots in the axial direction, the slots of the concentric layers being circumferentially offset from one another and possibly each layer insulated from its neighbor. These slots cut the lines of magnetic flux within the shield and further reduce any residual parasitic losses that may tend to dissipate energy stored in the flywheel.

Although the present invention has been described by way of an exemplary embodiment utilizing an axial translation carriage to decouple the motor/generator rotor and stator, other mechanisms may be employed to accomplish the same objective. For example, the stator may be constructed such that it may be radially expanded with the pivot at 180° like a clam shell, or translated radially in two or more segments away from the axis of rotor rotation to a distance that would effectively nullify the magnetic field effects. The choice of a particular mechanism for decoupling the motor/generator rotor and stator is influenced, in large part, by volumetric packaging considerations. The axial displacement translation carriage of the embodiment described herein makes efficient utilization of space and also facilitates the use of magnetic shield structure 310 to further reduce energy dissipation.

As illustrated in FIG. 6 the stator may be constructed as a plurality of separable annular segments 320*a*, 320*b*. Such segments may be decoupled from the rotor by withdrawing them in an outward radial direction possibly also in conjunction with a translation in an axial direction. Two segments are illustrated in FIG. 6; however, it will be appreciated that the stator may be divided into a greater number of segments if desired.

Alternately, as illustrated in FIG. 7, the stator segments 330*a*, 330*b* may be pivotally mounted to the flywheel structure such that they can be withdrawn in an arcuate path from operative engagement with the rotor. Here again, two segments are illustrated, although a greater number of segments could be employed if desired.

One potential problem attendant to the preferred method of constructing rotor 104 with a fiber composite wound on sleeve 106 is expansion of the fiber composite material away from the sleeve during the curing process. This may result in complete separation at the sleeve-fiber interface. Several solutions to this problem are available. One such solution is to wind the rotor on a winding mandrel somewhat smaller in diameter than the operational sleeve 106. Preferably, there is an interference fit between the bore of the cured rotor 104 and the outside diameter of sleeve 106. The sleeve is chilled prior to insertion into the finished rotor, which may also be heated, thereby facilitating assembly.

Figure 8:
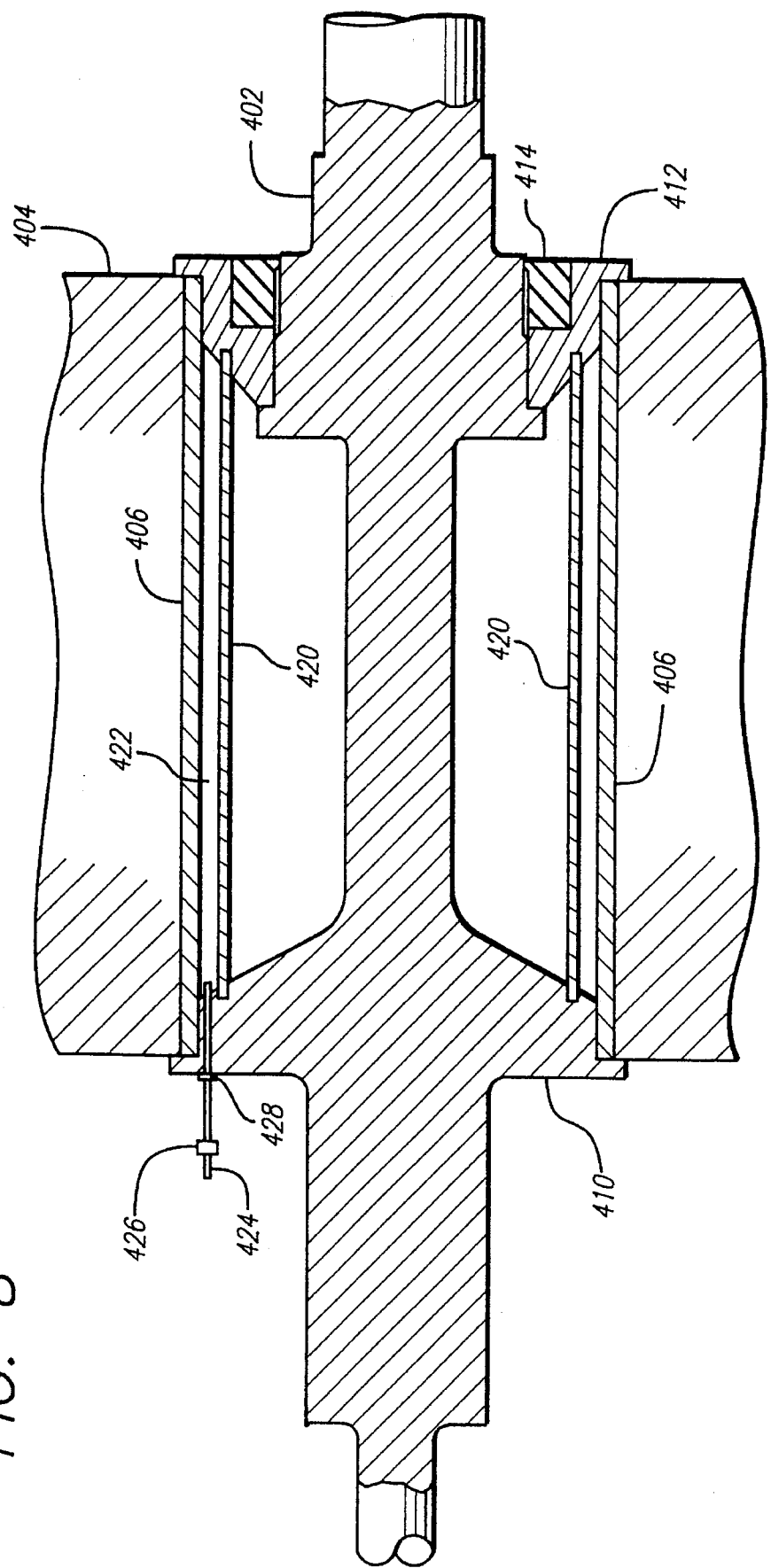
FIG. 8 illustrates an alternative rotor sleeve design.

An alternative solution utilizes a rotor design having a fluid filled chamber as shown in FIG. 8. In the as-machined condition, rotor sleeve 406 has an outside diameter that is a slip fit within the bore of cured rotor 404. After the rotor and sleeve are assembled, they are secured to shaft 402 with support ring 412 and rotor nut 414 in the same manner as previously described. An inner sleeve 420 is also supported on shaft 402/410 and support ring 412, the annular space between inner sleeve 420 and rotor sleeve 406 defining chamber 422.

A capillary tube 424 extends through and is sealed to axle flange 410 extending into chamber 422. Tube 424 is fitted with valve 426 and a crush valve 428 adjacent to axle flange 410. Valve 426 is opened, evacuated and fluid is introduced into chamber 422 through tube 424. When chamber 422 is completely filled, with no gas entrainment, then crush valve 428 is sealed. The fluid with which chamber 422 is filled is preferably the liquid phase of a material that expands upon fusion and whose melting point is less than about 380° F. (193° C.). As the fluid cools to the solid phase, it expands, thereby forcing sleeve 406 into secure engagement with the bore of rotor 404. Various materials suitable for use as the fluid are known. These include, for example, alloys of bismuth. A suitable alloy having a melting point of 103° C., comprises 54% Bi, 26% Sn and 20% Cd.

It is not necessary to have a phase change in order to achieve the desired expansion of sleeve 406. In this regard, a high molecular weight gaseous material may be employed. Such a material would be chilled prior to introduction into chamber 422, but not necessarily below the boiling point. As the material warms to room temperature, the pressure increases within the relatively fixed volume of chamber 422, eventually causing the desired expansion of sleeve 406.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. An energy storage system comprising:

a housing;

a flywheel mounted within the housing for rotation about an axis;

a generator disposed within the housing, said generator having a rotor coupled to the flywheel and a stator;

means for moving the stator between a first position in operative alignment with the rotor and a second position in which the rotor and stator are substantially electromagnetically decoupled, wherein the stator comprises a plurality of segments and said means for moving the stator moves each of said segments in a radial direction.

2. An energy storage system comprising:

a housing;

a flywheel mounted within the housing for rotation about an axis;

a generator disposed within the housing, said generator having a rotor coupled to the flywheel and a stator;

means for moving the stator between a first position in operative alignment with the rotor and a second position in which the rotor and stator are substantially electromagnetically decoupled, wherein the stator comprises a plurality of segments pivotally coupled to the housing and said means for moving the stator moves each of said segments in an arcuate path intersecting said axis.

3. An energy storage system comprising:

a housing;

a flywheel mounted within the housing for rotation about an axis;

a generator disposed within the housing, said generator having a rotor coupled to the flywheel and a stator;

means for moving the stator between a first position in operative alignment with the rotor and a second position in which the rotor and stator are substantially electromagnetically decoupled; and a generally cylindrical magnetic shield coupled to the housing and surrounding the generator stator in the first position, whereby magnetic flux lines of the generator rotor are contained within the magnetic shield when the stator is in the second position.

4. An electromagnetic rotating device comprising:

a rotor section having a plurality of magnetic poles, said rotor section rotating on an axis of rotation;

an electromagnetic stator section disposed in a first position operatively electromagnetically coupled to the rotor section such that lines of magnetic flux from said plurality of magnetic poles are closed through said stator section means for moving the stator section between said first position and a second position in which the rotor section and stator section are substantially electromagnetically decoupled, wherein the stator section comprises a plurality of segments and the means for moving the stator section moves each of said segments in a radial direction.

5. The device of claim 4 wherein the electromagnetic rotating device comprises a motor.

6. The device of claim 4 wherein the electromagnetic rotating device comprises a generator.

7. An electromagnetic rotating device comprising:

a rotor section having a plurality of magnetic poles, said rotor section rotating on an axis of rotation;

an electromagnetic stator section disposed in a first position operatively electromagnetically coupled to the rotor section such that lines of magnetic flux from said plurality of magnetic poles are closed through said stator section;

means for moving the stator section between said first position and a second position in which the rotor section and stator section are substantially electromagnetically decoupled, wherein the stator section comprises a plurality of segments pivotally coupled to said device and wherein the means for moving the stator section moves said segments in an arcuate path intersecting said axis of rotation.

8. The device of claim 7 wherein the electromagnetic rotating device comprises a motor.

9. The device of claim 7 wherein the electromagnetic rotating device comprises a generator.

10. A flywheel assembly comprising:

a shaft defining an axis of rotation;

a cylindrical sleeve carried on said shaft, said sleeve closed at each of two opposing axial ends to define an enclosed volume;

a rotor carried on said sleeve;

means for admitting a fluid into said enclosed volume;

means for sealing the fluid within said enclosed volume;

wherein said sleeve is deformed by expansion of said fluid within said enclosed volume to tightly engage said rotor.

11. The flywheel assembly of claim 10 wherein the cylindrical sleeve is a first cylindrical sleeve and further comprising a second cylindrical sleeve of smaller diameter than the first sleeve carried on said shaft coaxial with the first sleeve, wherein said enclosed volume is defined between said first and second sleeves.

12. The flywheel assembly of claim 10 wherein said means for admitting said fluid comprises a tube penetrating into said enclosed volume.

13. The flywheel assembly of claim 10 wherein said means for sealing the fluid comprises a crush valve.

14. The flywheel assembly of claim 10 wherein said fluid is a low melting point alloy introduced into said enclosed volume in a liquid phase.

15. The flywheel assembly of claim 14 wherein the alloy is an alloy comprising bismuth.

16. The flywheel assembly of claim 10 wherein said fluid is a high molecular weight gas.

* * * * *

UNITED STATES PATENT AND TRADEMARK OFFICE
CERTIFICATE OF CORRECTION

PATENT NO.   :   5,614,777
DATED        :   March 25, 1997
INVENTOR(S)  :   Bitterly et al.

It is certified that error appears in the above-identified patent and that said Letters Patent is hereby corrected as shown below:

In column 3 at line 46, please delete " 106 " and insert -- 108 --.

In the title page, item [75] Inventors, please delete " both of Calif. " and insert -- Harvey Henning, Newbury Park, and Roy Hoar, Newbury Park, all of Calif. --.

Signed and Sealed this

First Day of December, 1998

*Attest:*

BRUCE LEHMAN

*Attesting Officer*          *Commissioner of Patents and Trademarks*